Jan. 2, 1945. J. R. PATTEE 2,366,454
TIMER SWITCH
Filed Aug. 26, 1941 2 Sheets-Sheet 1
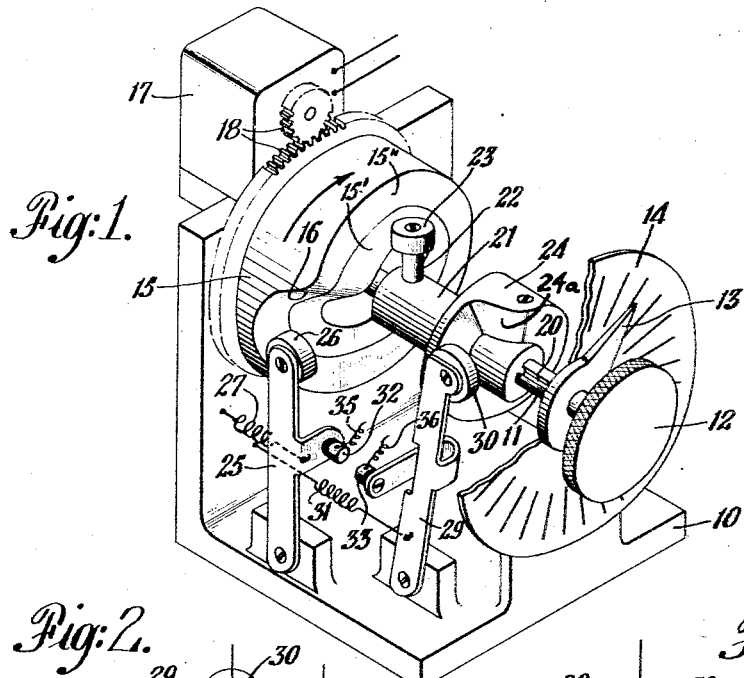
INVENTOR
JOHN ROBERT PATTEE
BY
E. C. Sanborn
ATTORNEY Jan. 2, 1945.  J. R. PATTEE  2,366,454
TIMER SWITCH
Filed Aug. 26, 1941  2 Sheets-Sheet 2
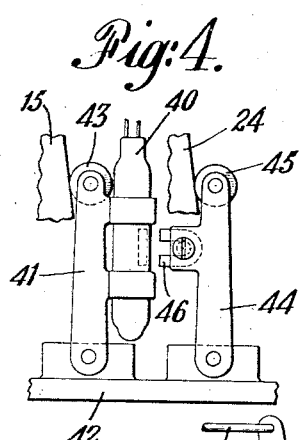
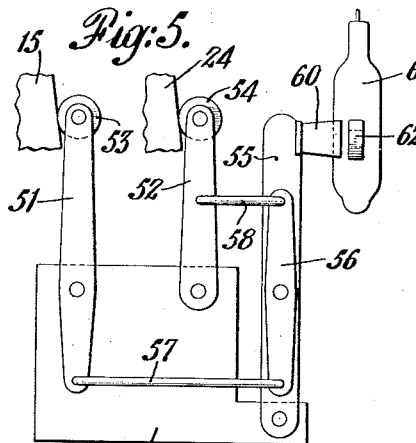
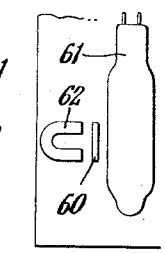
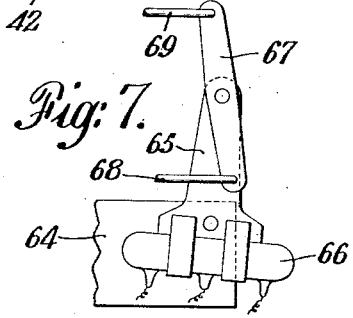
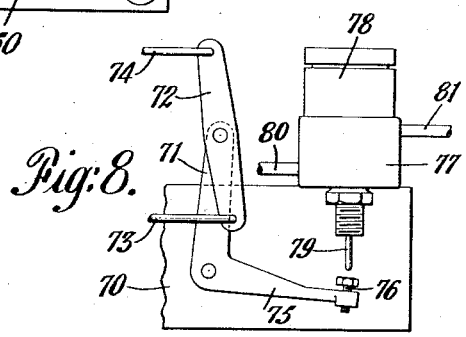
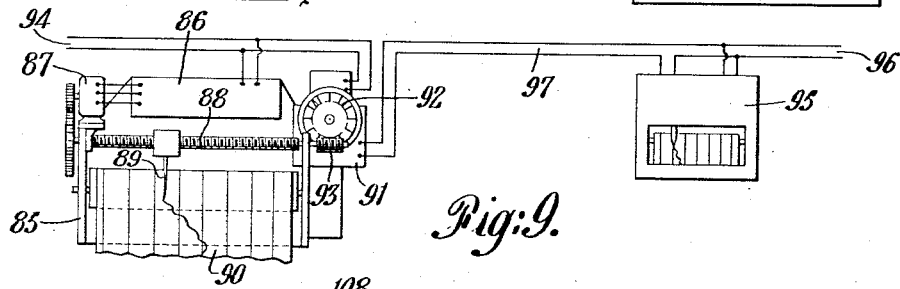
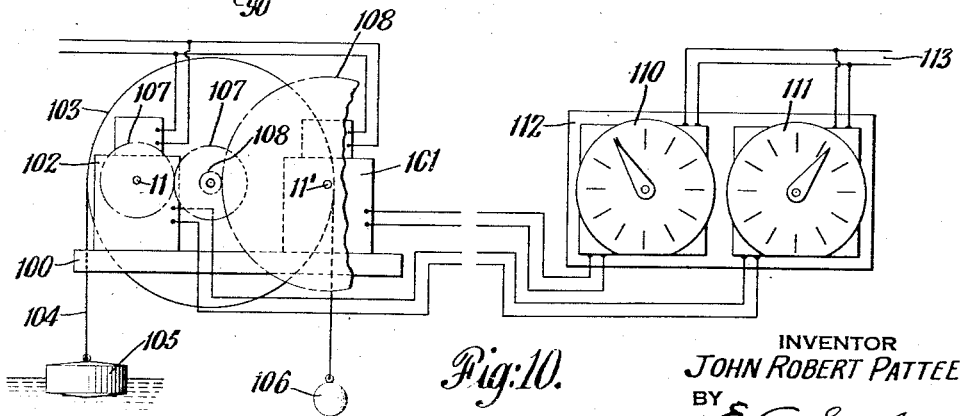
INVENTOR
JOHN ROBERT PATTEE
BY
E. C. Sanborn
ATTORNEY Patented Jan. 2, 1945

2,366,454

UNITED STATES PATENT OFFICE 2,366,454

TIMER SWITCH

John R. Pattee, Waterbury, Conn., assignor to The Bristol Company, Waterbury, Conn., a corporation of Connecticut Application August 26, 1941, Serial No. 408,300

16 Claims. (Cl. 200—33)

This invention relates to impulse controlling devices, and more especially to instrumentalities establishing the durations of successive impulses of energy flow in a cyclical series. In the field of automatic control and measurement, and more especially in the art of telemetering, there arise many instances where it is desirable that there be provided a series of signals or impulses (usually of electrical energy) occurring cyclically and of durations variable to correspond with a measured magnitude. A telemetering instrument dependent for its operation upon impulses of this nature is fully disclosed and set forth in U. S. Letters Patent No. 2,040,918, issued to applicant's assignee, May 19, 1936. In this device an indicating or recording instrument is adapted to have its index or pen positioned in accordance with the durations of successive cyclical electrical impulses conveyed over a circuit from a remotely located transmitting instrument.

An impulse controlling device suited to use as a transmitter for establishing cyclical impulses whereby measurements of a magnitude may be obtained in a receiving instrument of the class set forth is described in U. S. Letters Patent No. 1,822,683, issued to K. Wilde, October 22, 1927, and reissued as No. 19,039, Jan. 2, 1934; but as a transmitter, this device suffers the handicap that it is operable through only a limited angle of deflection.

It is an object of the present invention to provide means readily associated with a measuring instrument to provide a transmitter suitable for use in such a system as that described in the above-mentioned Patent No. 2,040,918, and having a repetitive characteristic, wherein upon the attainment of a maximum period of the time setting a further setting will cause the timing to revert to a minimum value.

It is a further object of this invention to provide a device of the class described which shall be readily operable by manual means to transmit signals and readings of predetermined settings.

It is a further object to provide means whereby the timing of electrical impulses for test purposes such as the checking of damping characteristics of electrical instruments may readily be checked.

It is a further object to provide a device of the class described which shall lend itself readily to use with contacts of the enclosed mercury actuated type.

It is a further object to provide an impulse controlling device of the class described which shall be acceptable to the operation of pilot valves and the like for the control of fluid flow.

It is a further object to provide a device of the class described in which the relative positions of the contacts or equivalent elements shall be unaffected by the setting of the timing elements.

It is a further object to provide a device of the class described in which the time setting element may be moved through an unlimited range in either direction without respect to the position of the contacting mechanism.

In the drawings:

Fig. 1 is a perspective view of a mechanism embodying the principles of the invention.

Figs. 2 and 3 are diagrammatic representations of the mechanism with essential elements shown in different relative positions for purposes of explanation.

Fig. 4 is a side elevation of a form of the mechanism embodying a magnetically operated vacuum type mercury switch.

Fig. 5 is a side elevation of an adaptation of the mechanism to the operation of a switch similar to that shown in Fig. 4, without relative motion between the switch and the actuating magnet.

Fig. 6 is an end elevation of a portion of the same.

Fig. 7 represents elements of the mechanism adapted to the operation of a tilting mercury switch.

Fig. 8 is a representation of elements of the mechanism adapted to the operation of a pilot valve.

Fig. 9 illustrates an adaptation of the invention to the transmission of readings from a measuring instrument to a remotely located receiver.

Fig. 10 illustrates an adaptation of the invention to a particularly precise indication of liquid level at a remote station.

Referring now to drawings:

The numeral 10 designates a base-plate upon which the various elements of the mechanism are mounted. Journaled upon the plate 10 is a shaft member 11 adapted to be manually rotated throughout an unlimited angle as by a knurled knob 12, and to have its angular position indicated by means of an index 13 coacting with a graduated scale 14. Mounted coaxially with the shaft 11 and free for rotation thereabout is a cylindrical cam member 15 having a helical surface extending for slightly less than one revolution, the axially displaced extremities of said surface being connected by a surface 16.

Carried by the base 10 is a constant speed motor 17 adapted through gears 18 to drive the cam member 15 continuously in a clockwise sense, as shown by the arrow in the drawings, at a uniform velocity. Slidably mounted upon the shaft 11, but constrained against rotation relative thereto, as by a spline 20, is a hub element 21. Radially projecting from the hub element 21 is a post 22 carrying a cam follower 23 in the form of a roller adapted to engage the inner part of the surface of the cam 15, whereby upon rotation of said cam the hub element 21 will be caused to translate along the shaft 11 through a distance corresponding to the pitch of the helical surface characterizing the cam member 15. The surface 16 above referred to is so sloped that said follower 23 may climb from the lower to the higher portion of the helical surface of cam 15 with which said follower coacts, should said follower be forced in the normal direction of rotation of the cam, and at an angular velocity greater than that of the cam. Mounted upon and secured to the hub element 21 is a cam element 24 preferably of somewhat smaller diameter than the cam element 15 and having a helical surface of identical pitch to that on the cam element 15, and likewise having a sloping section of transition 24a to permit reverse rotation of the cam 24.

Pivotally mounted upon the base 10 is a cam-follower arm 25 carrying a roller 26 adapted to engage the outer part of the helical surface of cam member 15 and constrained in engagement therewith by means of a tension spring 27. The relative dimensions and positioning of the cam-followers 26 and 23 are such that, while both engage a common surface they do not at any position foul one another, so that the follower 23 may be rotated throughout an unlimited angle with the shaft 11. Pivotally mounted upon the base 10 is a cam-follower arm 29 carrying a roller 30 adapted to engage the helical surface of cam member 24 and constrained into engagement therewith by means of a tension spring 31. The pressure exerted by the roller 30 upon the cam member 24 due to the force of spring 31 is communicated to the hub member 21 thus tending to maintain the follower 23 at all times in engagement with the helical surface of the cam 15.

Carried by the arm 25 and insulated therefrom is an electric contact element 32. Resiliently mounted upon the arm 29 and insulated therefrom is an electric contact element 33. The relative disposition of the contact elements 32 and 33 is such that when the arms 25 and 29 are at their position of maximum separation as determined by the relative position of elements of the mechanism, said contacts are out of engagement, and when said arms are in their position of closest proximity said contacts are in engagement, the resilient mounting of contact 33 tending to maintain such engagement without at any time interrupting the mechanical train formed by other elements of the mechanism. Electrical conductors 35 and 36, connected to the contact elements 32 and 33 respectively, provide communication with an external circuit, so that said contacts may be made effective for the purpose of completing and interrupting said circuit.

The operation of the mechanism as thus far described may be explained as follows: Upon the motor 17 causing the cam element 15 to be rotated, the follower 26 and the arm 25 will have an oscillatory motion imparted thereto, the arm tending to swing with a uniform velocity, through a limited angle, during the greater part of the rotation of the cam element, and while it is engaged with the helical surface, and then more or less abruptly returning to its starting position as the roller 26 follows the contour of the surface 16. In a similar manner, the roller 23 following the contour of the cam element 15 will cause the hub element 21 to be translated through a limited distance along the shaft 11, imparting a similar motion to the cam member 24 and thereby through the roller 30 to the arm 29. Thus the arms 25 and 29, and with them the contact elements 32 and 33, will partake of an oscillatory motion, describing a complete cycle with each revolution of the cam element 15. The contacts will translate relatively slowly and at the same rate, without relative motion, as the rollers 23 and 26 follow the helical face of the cam element 15, and will partake alternately and abruptly of a return motion as the respective rollers follow the transition surface 16 and pass from the highest to the lowest level of the cam surface. The oscillations of the members carrying the respective contacts will differ in phase according to the relative angular displacement of the followers 23 and 26 about the axis of shaft 11. Thus the contacts 32 and 33 will be abruptly engaged and abruptly separated to determine intervals in the normal cycle of operation; and the duration of the time of engagement with respect to the time of separation in each cycle will depend upon said angular displacement. As shown in Fig. 1, this displacement approximates 90 angular degrees, so that the time the contacts are separated will represent about one quarter of the whole cycle. For a further understanding of the principles of the invention, reference may be had to Figs. 2 and 3.

Fig. 2 diagrammatically represents a development of the essential elements of the mechanism shown in Fig. 1, the angular spacing between the cam-followers 26 and 23 being represented by the distance M. The elements of the mechanism are illustrated in three relative positions represented by "A," "B," and "C" respectively. The parts are shown at "A" with the cam-follower 23 having reached the highest point of the contour of cam member 15 and about to pass down the surface 16 to the lowest point of said contour. It will be seen that under this condition the roller 30 as positioned by the cam member 24 will support the arm 29 and the contact member 33 out of engagement with the arm 25 and the contact 32 as positioned by the follower 26. At "B," the elements of the mechanism are shown with the cam member 15 having advanced through an angle corresponding to the distance M, so that the follower 26 is about to pass from the highest to the lowest level of the contour of cam 15. The follower 23 now lying on a lower element of the contour than the follower 26, the cam member 24 and the follower 30 will have translated to a position wherein contact elements 32 and 33 are brought into engagement, the resilient portion of arm 29 yielding to permit such engagement without separation of any of the followers from their corresponding cam surfaces. At "C" the relative position of the elements is similar to that shown at "A," the follower 26 having passed from the higher to the lower level of the contour of cam member 15 and thus acting to withdraw the contact element 32 from engagement with contact element 33. In general it may be said that so long as the middle of the transition surface 16 is moving from the circuit-opening follower (26 in Figs. 1, 2 and 3) to the circuit-closing follower (23 in Figs. 1, 2 and 3), the circuit will be open.

This condition is illustrated in Fig. 1, and "A" and "C" in Fig. 2, and "D" in Fig. 3. While the middle of the transition surface 16 is moving from the circuit-closing follower to the circuit-opening follower, the circuit will be closed. This condition is illustrated at "B," Fig. 2, and "E," "F," in Fig. 3. Except as one or another of the cam followers abruptly translates between the limits of its coacting cam surface there will be no change in the relative position of the contact elements.

Fig. 3 is a diagrammatic representation, similar to that in Fig. 2, of the essential elements of the mechanism in their relative positions corresponding to a time setting differing from that shown in the previous drawings. The position of the follower 23 has been advanced, as by rotating the knob 12 in Fig. 1, until the angle between the followers 23 and 26 has increased to a value as linearly represented by N in Fig. 3. At "D" the several elements are shown in relative positions corresponding to the cam member 15 lying in the same position as at "A" in Fig. 2. It will be observed that while the spacing between followers 23 and 26 is much greater than in Fig. 2, the contacts 33 and 32 remain separated by the same distance as that corresponding to the previous setting. This is because the changed relative displacement normal to the face of the cam 15 due to the new adjustment is compensated for by the inclination of the surface of cam 24 in its relation to follower 30. By an examination of "D" in Fig. 3, it will be seen that the cam 24 and the follower 23 can be set at any position along the cam element 15, exclusive of the sloping transition surface 16, and the region in which the follower 30 passes over the transition surface 24a, without producing any displacement of the follower 30 with respect to the follower 26, and therefore, without changing the relative spacing of the contacts 32 and 33. At "E" the elements are shown with the cam 15 having moved to a position corresponding to that shown at "C" in Fig. 2, the transition surface 16 now moving from the follower 23 to 26, with the result that contacts 32 and 33 are now in engagement. At "F" the elements are shown with the cam 15 in such a position that the follower 26 is about to pass down the transition surface 16 from the highest to the lowest level on the cam surface. It will be seen that during the time interval between the follower 23 having dropped to the lower surface and the follower 26 having attained the position shown at "F" the whole assembly involving the three cam followers and the cam element 24 will have been displaced through a distance equivalent to the common pitch of the cam members 15 and 24, and that the contact elements 32 and 33 will not have changed their relative position. Upon further advance of the cam member 15, the follower 26 will pass down the transition surface 16 to the lowest point of the contour, and the elements of the mechanism will revert to the position shown at "D."

There has thus been provided a mechanism in which electric contacts may be abruptly closed and abruptly opened to establish a definite time interval in a cycle, and in which the duration of the interval may be continuously varied from any value between zero and the full time of the cycle by the shifting of an adjustable part. By virtue of the inclined transition surface 16 on the cam element 15 and the similar surface on the cam element 24, provision is made for adjustment in a reverse direction. Thus, should the cam element 24 be manually adjusted in the same direction as the normal direction of motion of the cam element 15, and at a velocity greater than that of said cam element 15, the follower 23 being in the form of a roller, will climb the transition surface 16 from the lower to the higher level without straining any part of the mechanism. Again, should the cam element 24 be adjusted in a reverse direction, the follower 30 will similarly climb the transition surface from the lowest to the highest point of the contour and establish the proper relationship between contacts without introducing any strains. It will be obvious that in applications of the invention to conditions wherein the hub 21 and parts carried thereby will never be required to be adjusted in the direction of rotation of the cam 15 at an angular velocity greater than that of said cam, the sloped transition surface of cam 15 may be replaced with a flat axially disposed radial surface, and the followers 23 and 26 materially reduced in diameter, or replaced by knife-edge contacts. It will be further apparent that where the full range of the measured magnitude may be represented by less than a complete revolution of the hub 21 and parts carried thereby, the angle subtended by the helically conformed surface of the cam element 24 may be correspondingly reduced, and the shape of the transition surface is unimportant, because, under this condition, proper adjustment and operation of the mechanism requires that the said transition surface shall not pass under follower 30.

While, for purposes of simplicity, the cam 15 has been shown as having a single helical surface, it may be considered as a close combination of two cam components 15' and 15" of identical pitch, cooperating independently with the followers 23 and 26, the former following a path defined by the cam component 15' and the latter that defined by the component 15". It will be obvious that said components might be physically separated and rotatably connected by a shaft or gearing so as to obtain a relative performance equivalent to that herein set forth. It will further be apparent that, while the device has been shown in a form in which only one cycle of action is represented by one revolution of the respective cam elements, said elements may be made to incorporate portions of a multiple-thread helix, thus establishing a plurality of cycles per revolution.

In Fig. 4 is shown a modification of the invention in which use is made of a magnetically operated vacuum type mercury switch of the class set forth and fully described in U. S. Letters Patent No. 2,121,235, issued June 21, 1938, to Karl Hunciker. In this form of switch a vertically mounted enclosed evacuated envelope of glass or the like includes a small globule of mercury resting in its bottom portion. Adapted to contact said globule electrically are two electrodes sealed into the glass and providing connection to an external circuit. One of said electrodes is resiliently mounted and carries a small ferro-magnetic armature adapted to be influenced by an external magnetic field, whereby said electrode may be moved into or out of engagement with the mercury according to the intensity of the field within which it lies. Such a switch is designated by the numeral 40 in Fig. 4 and is supported by clips or in other conventional manner from an arm 41 pivotally mounted upon a base-plate 42 and having a cam-follower 43 in the form of a roller adapted to replace the arm 25 and follower 26 in Fig. 1, and engage the surface of continuously rotating cam element 15. An arm 44 pivotally mounted upon the base-plate 42 is provided with a cam-follower in the form of a roller 45 adapted to replace the follower 30 in Fig. 1 and engage the surface of cam member 24. The arm 44 carries a small permanent magnet 46 juxtaposed to the switch 40 in such a manner that the relative movement of arms 41 and 44 due to the interaction as hereinbefore described of the cam-followers with the surfaces of cam elements 15 and 24 will produce sufficient relative motion between the switch 40 and the magnet 46 to actuate the contact element within said switch. Thus, during that portion of the cycle of rotation of cam 15 wherein the arms 41 and 44 move in a similar manner, there will be no relative displacement between the switch 40 and the magnet 46, and the condition of the contact within the switch will not be changed. As the follower 23 (in Fig. 1) leaves the highest point of the contour of the cam element 15, and the cam element 24 quickly translates in an axial sense, the follower 45 and the arm 44 will approach the arm 41, and the magnet 46 will be abruptly brought into close relationship with the switch 40, operating the same in one sense; and as the follower 43 leaves the highest point of the contour of cam element 15 the switch 40 will be quickly withdrawn from the influence of magnet 46, operating the contacts of the switch in the opposite sense. There has thus been provided an electrical switch controlling function similar to that hereinbefore set forth in the analysis of the mechanism as shown in Fig. 1, with the added features inherent in the magnetically operated enclosed mercury type of switch. Because for the operation of the switch 40 it is not required that the magnet 46 at any time make contact with the envelope of the switch, it is unnecessary to include in the system a yielding member such as is provided by the resilient portion of the arm 29 shown in Fig. 1.

In Figs. 5 and 6 is shown a further alternative, providing for the operation of a magnetically actuated switch through a differential lever and in a manner whereby neither the switch nor the magnet requires to be moved. Pivotally mounted upon a base-plate 50 are arms 51 and 52, carrying cam-followers in the form of rollers 53 and 54, adapted to engage respectively, in a manner similar to the rollers or followers 26 and 30 in Fig. 1, cam surfaces 15 and 24, whereby said arms may partake of motions in a manner identical to the arms 25 and 29. A further arm 55, also pivotally mounted upon the plate 50, carries an extended differential lever 56 pivotally mounted at a point intermediate its own extremities upon said arm. Said differential lever has at its extremities pivot points of attachment operatively connected to the arms 51 and 52 by means of links 57 and 58 respectively. The relative arrangement of the several arms and lever as thus far set forth is such that as the arms 51 and 52 swing in the same angular sense the differential lever 56 will tend to rotate about its mid-point of connection without producing displacement of the arm 55, and when relative motion takes place between the arms 51 and 52 the differential lever 56 will tend to translate, producing a corresponding deflection of the arm 55.

The arm 55 carries a vane 60 of ferro-magnetic material; and fixedly mounted in juxtaposition thereto are a switch 61 of the magnetically operated type hereinbefore set forth, and a permanent magnet 62 suitable for the operation of said switch. The relative disposition of the switch 61, magnet 62, and vane 60, is such that as the arm 55 carrying said vane swings throughout its angle of deflection the vane will be introduced into, or withdrawn from, the field of the magnet in a manner to change the amount of flux reaching the sensitive element of the switch 61 from the magnet 62, and thereby to actuate the switch. The mode of action of this element of the mechanism is identical with that of the switching element fully set forth and described in U. S. Letters Patent No. 2,214,159, issued to applicant's assignee September 10, 1940. There has thus been provided a contacting mechanism of a highly effective nature, subject to operation according to the principles of the invention, and having a minimum of inertia in its moving parts.

In Fig. 7 is shown an application of the principles of the invention to a tilting mercury switch of the conventional type. Pivotally mounted upon a base-plate 64 is a rocker arm 65 having secured thereto by clips or other suitable means a mercury switch 66 of the conventional tilting type. As illustrated, the switch 66 is shown of the single-pole double-throw class, making possible its use for circuit-closing or circuit-opening or for both functions simultaneously. It will be obvious to those versed in the art that the switch 66 can be replaced by any one of the large variety of types of tilting mercury switches regularly available. Pivotally mounted upon the arm 65 is a differential lever 67 having connecting links 68 and 69 corresponding in every respect to the similar elements 56, 57 and 58 in Fig. 5. Upon operation of the cam-followers as shown in Fig. 5, the switch 66 will be abruptly tilted in one direction or the other, producing a corresponding control of an electric circuit in accordance with the setting of the time elements of the mechanism.

In Fig. 8 is shown an embodiment of the mechanism similar in all respects to that illustrated in Fig. 7 but replacing the electric switch by a pilot valve suited to the operation of pneumatically controlled devices. Pivotally mounted upon a base-plate 70 is a lever element 71 carrying a differential lever 72 with connecting links 73 and 74 corresponding in their arrangement and function with the differential lever 67 and links 68 and 69 as shown in Fig. 7. Forming a part of the lever arm 71 is a tappet arm 75 carrying a tappet screw 76 adapted to be moved through a small distance with deflection of the lever arm 71. Mounted upon the base-plate 70 is an air distributor 77 carrying a pilot valve 78, which advantageously may be of the type fully described and set forth in U. S. Letters Patent No. 1,890,494, issued to applicant's assignee December 13, 1932. The valve 78 is provided with a stem portion 79 adapted for actuation by the tappet 76, whereby according to the relative position of the cams and other elements of mechanism as shown in Fig. 1 the valve 78 may be abruptly opened or closed to control the passage of air or other pressure fluid between conduits 80 and 81 connected to the air distributor 77.

In Fig. 9 is shown an adaptation of the invention to the transmission of readings from a measuring instrument to a remotely located recorder. The numeral 85 designates an instrument of the self-balancing or relay type, preferably of the class fully set forth and described in U. S. Letters Patent No. 2,082,109, issued to applicant's assignee June 1, 1937. This instrument includes a balancing mechanism 86 adapted to control the operation of a reversible motor 87 geared to a lead screw 88 whereby a recording pen or stylus 89 can be positioned with respect to a graduated scale or chart 90 and thus provide an indication or record of the value of an electrical magnitude measured by the instrument 85. Mounted upon the framework of the instrument 85 is a transmitting element 91 which may be identical in all respects with the unit shown in Fig. 1, with the exception that the setting knob 12 of Fig. 1, rotating the shaft 11 and parts carried thereby, is replaced by a worm wheel 92 adapted to cooperate with a worm 93, mounted upon the shaft of the lead screw 88, and having such pitch relationships that a complete transit of the pen or stylus 89 will be represented by less than one complete revolution of the shaft 11. The position of the worm wheel 92 will thus be definitely related to that of the pen, so that contacts actuated by the transmitting unit will establish cyclical electric impulses of durations representative of the value measured by the instrument 85. Motive power for the instrument 85 and the transmitting unit 91 are derived from a source of electrical supply 94.

A receiving instrument 95, preferably of the type fully disclosed and set forth in hereinbefore mentioned U. S. Letters Patent No. 2,040,918, is adapted to receive electric power from a source 96 and to respond to the impulses transmitted cyclically from the unit 91 through an interconnecting circuit 97, whereby a pointer or stylus in said instrument 95 will be positioned with respect to a scale or chart in response to the durations of said impulses, thus providing in the instrument 95 a duplication of the reading of the instrument 85 and a remote measurement of the magnitude primarily determined by said last-named instrument.

In Fig. 10 is represented an adaptation of the invention to the remote indication of liquid level, wherein the precision of measurement required is such that there is necessary a "vernier" arrangement to permit of sufficiently close reading. Mounted upon a base-plate 100 are two transmitting units 101 and 102. each of the type heretofore set forth. Rotatably mounted upon the same base-plate is a pulley 103 adapted to carry a tape 104 connected to a float 105, resting upon the surface of a body of liquid whose level is to be determined and indicated at a remote point. A counterweight 106 serves to balance the float 105 and in a conventional manner to maintain the tape 104 in a suitable degree of tension. By means of gearing 107 which may expediently have a 1/1 ratio, the shaft of the pulley 103 is operatively connected to the shaft 11 of the transmitting unt 102; and by means of gearing 108 which may expediently have a 1/10 ratio, said shaft of pulley 103 is operatively connected to the shaft 11' of the transmitting unit 101. By this arrangement one revolution of the pulley 103 will be represented by one revolution of the shaft 11 of transmitting unit 102 and by only $\frac{1}{10}$ of a revolution of the shaft 11' of transmitting unit 101.

The receiving instrument includes two indicating units 110 and 111 of the type described in the above-mentioned Patent No. 2,040,918, mounted on a common base 112 and adapted to be operatively energized from a source of electrical energy 113. Receiving unit 110 is electirically connected to transmittig unit 101 and receiving unit 111 is electrically connected to transmitting unit 102. This connection may be provided either by separate electrical circuits, or by the use of alternating current for one unit and direct current for the other with suitable filtering arrangements operating over a single two-conductor circuit, or by an arrangement utilizing leading and lagging currents as described in U. S. Letters Patent No. 2,100,467, issued to applicant's assignee November 30, 1937. Whatever the interconnecting system used, the receiver 110 will provide an indication of the position of transmitter 101, and the receiver 111 of transmitter 102. Assuming that the range of travel of the float 105 is represented by 10 revolutions of the pulley 103, it will be seen that this range will be represented by one revolution of the shaft 11' of the transmitting unit 101, to which the full scale deflection of the pointer of the receiving unit 110 may be made to correspond. The full range of measurement will be represented by 10 revolutions of the shaft 11 of transmitting unit 102, which will be represented by 10 complete revolutions of the pointer of the receiving unit 11. Thus, assuming for the moment that the range of measurement is 10 feet, the scale of instrument 110 will provide a reading of the level in terms of feet while the scale of receiving instrument 111 will interpolate these readings and provide an indication of tenths of feet. Thus, by combining two telemetering systems of the type set forth, the degree of precision is in this case increased by 10 times over the precision of a single unit.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In an impulse-controlling device: the combination of movable cam means adapted to produce through a limited range a uniformly increasing deflection and a quick return, two followers adapted to engage said cam means and to be cyclically and similarly actuated, and by their relative displacement in the direction of travel of said cam means to receive their actuation in a time phase relationship corresponding to said displacement, together with an impulse controlling couple subject to the joint and simultaneous influence of said followers, and means operable during movement of said cam means to vary the magnitude of said displacement in conformity with a measured magnitude.

2. In an impulse-controlling device: the combination of movable cam means adapted to produce through a limited range a uniformly increasing deflection and a quick return, two followers adapted to engage said cam means and to be cyclically and similarly actuated, and by their relative displacement in the direction of travel of said cam means to receive their actuation in a time phase relationship corresponding to said displacement, one of said followers adapted to be independently and non-interferingly positioned with respect to the other and to said cam means, together with an impulse controlling couple subject to the joint and simultaneous influence of said followers, and means operable during movement of said cam means to vary the magnitude of said displacement in conformity with a measured magnitude.

3. In an impulse-controlling device: the combination of movable cam means adapted to produce through a limited range a uniformly increasing deflection and a quick return, two followers adapted to engage said cam means and to be cyclically and similarly actuated, and by their relative displacement in the direction of travel of said cam means to receive their actuation in a time phase relationship corresponding to said displacement, a control couple having one element actuated by said first-named follower and another element by said last-named follower, said elements coacting to establish the durations of successive cyclical impulses of energy.

4. In an impulse-controlling device: the combination of movable cam means adapted to produce through a limited range a uniformly increasing deflection and a quick return, two followers adapted to engage said cam means and to be cyclically and similarly actuated, and by their relative displacement in the direction of travel of said cam means to receive their actuation in a time phase relationship corresponding to said displacement, a magnetically actuated switch movable by one of said followers, a magnet movable by the other of said followers, said magnet coacting with said switch to establish the durations of successive cyclical impulses of energy.

5. In an impulse-controlling device: the combination of movable cam means adapted to produce through a limited range a uniformly increasing deflection and a quick return, two followers adapted to engage said cam means and to be cyclically and similarly actuated, and by their relative displacement in the direction of travel of said cam means to receive their actuation in a time phase relationship corresponding to said displacement, a differential member having one part actuated by said first-named follower and another part actuated by said last-named follower, said member partaking of the joint influence of said followers to establish the durations of successive cyclical impulses of energy.

6. In an impulse-controlling device: the combination of a cam element having a surface conformed to a helix of predetermined pitch and limited extent and adapted for rotation about the axis of said helix, a follower operatively engaging said surface and displaceable only in a sense substantially parallel to said axis and in response to the rotation of said cam element and, a second follower operatively engaging said surface and adapted for displacement both parallel to said axis in response to the rotation of said cam element, and in an angular sense about said axis in response to changes in a measured magnitude, to vary the phase relationship of its axial motion with respect to that of said first-named follower, a second cam-element having a pitch similar to that of said first-named cam element and attached to said follower, and adapted for axial and angular displacement with the same, a third follower operatively engaging the surface of said second cam element and displaceable in response to the motion of said second cam element and only in a sense substantially parallel to said axis, together with a control couple subject to the joint influence of the displacements of said first and third followers to establish successive cyclical impulses of energy of durations dependent upon the angular displacement of said second-named follower, and adapted for measurement of said magnitude.

7. In an impulse-controlling device: the combination of a cam element having a surface conformed to a helix of predetermined pitch and limited extent and adapted for rotation about the axis of said helix, a follower operatively engaging said surface and displaceable only in a sense substantially parallel to said axis and in response to the rotation of said cam element and, a second follower operatively engaging said surface and adapted for displacement both parallel to said axis in response to the rotation of said cam element, and in an angular sense about said axis in response to changes in a measured magnitude, to vary the phase relationship of its axial motion with respect to that of said first-named follower, a second cam-element having a pitch similar to that of said first-named cam element and attached to said follower, and adapted for axial and angular displacement with the same, a third follower operatively engaging the surface of said second cam element and displaceable in response to the motion of said second cam element and only in a sense substantially parallel to said axis, together with a control couple having one element actuated by said first-named follower and another element actuated by said last-named follower, said elements coacting to establish the durations of successive cyclical impulses of energy.

8. In an impulse-controlling device: the combination of a cam element having a surface conformed to a helix of limited extent and adapted for rotation about its axis, a follower operatively engaging said surface and constrained for displacement in response only to the conformation of the contour of said cam surface and substantially parallel to said axis, a second follower operatively engaging said surface and adapted for displacement both parallel to said axis in response to the conformation of said contour and in an angular sense about said axis to vary the phase relationship of its axial motion with respect to that of said first-named follower, together with an impulse controlling couple subject to the joint influence of the displacements of said followers.

9. In an impulse-controlling device: the combination of a cam element having a surface conformed to a helix of limited extent and terminated by axially and angularly displaced radii, and adapted for rotation about its axis in a direction to give a gradual deflection and a quick return, a follower operatively engaging said surface and constrained for displacement in response only to the conformation of the contour of said cam surface and substantially parallel to said axis, a second follower operatively engaging said surface and adapted for displacement both parallel to said axis in response to the conformation of said contour and in an angular sense about said axis to vary the phase relationship of its axial motion with respect to that of said first-named follower, said radii being connected by a transition surface so sloped and proportioned with respect to said followers as to permit relative operation of said cam element and followers in a sense opposite to said direction, together with a control couple subject to the joint influence of the displacements of said followers.

10. In an impulse-controlling device, a control couple having two elements adapted to coact concurrently to effect a control function, means for causing said elements to move independently through similar predetermined repetitive cycles of motion, means for adjusting the phase relationship of said cycles while said elements are in motion, and means controlled by the concurrent coaction of said elements for producing a control effect of duration governed by the phase relationship of the motions of said elements.

11. An impulse controlling device comprising cam means, a pair of elements cooperating with said cam means for operation thereby through similar repetitive cycles of motion, means responsive to values of a variable magnitude for changing the position of one of said elements with respect to the other to vary the phase relationship of said cycles, and means controlled jointly and simultaneously by said elements for producing a control effect of a duration corresponding with said phase relationship.

12. An impulse controlling device comprising a pair of movable coacting elements, means for causing said elements to move through similar repetitive cycles of motion, variable responsive means for changing the phase relationship of said cycles while said elements are in motion, and means controlled by the concurrent coaction of said elements for producing a control effect in correspondence with said phase relationship.

13. An impulse controlling device comprising rotatable cam means, a pair of elements cooperating with said cam means for operation thereby through similar repetitive cycles of motion other cam means receiving a translatory movement from said rotatable cam means through one of said elements, variable responsive means for shifting the last mentioned element with respect to the other of said elements for varying the phase relationship of the cycles of motion of said elements, and means controlled jointly by the second mentioned cam and said other of said elements for producing a control effect of a duration corresponding with said phase relationship.

14. An impulse controlling device comprising rotatable cam means, a pair of elements cooperating with said cam means for operation thereby through similar repetitive cycles of motion, other cam means receiving a translatory movement from said rotatable cam means through one of said elements, variable responsive means for rotating the last mentioned element together with the second mentioned cam means with respect to the other of said elements and the first mentioned cam means to vary the phase relationship between the cycle of motion of one of said elements and said second mentioned cam means and the cycle of motion of said other of said elements, a member shiftable by the second mentioned cam means, and means jointly controlled by said member and said other of said elements for producing a control effect of a duration corresponding with said phase relationship.

15. An impulse controlling device comprising continuously operable motor means, a control couple comprising a pair of elements continuously coacting to produce control effects, means driven by said motor means for causing said elements to move independently through similar predetermined repetitive cycles of motion, means operable during movement of said elements for varying the phase relationship of said cycles in conformity with variations in a measured magnitude, and means jointly and simultaneously controlled by said elements for establishing successive cyclical impulses of energy of durations governed by the phase relationship of the motions of said elements.

16. An impulse controlling device comprising continuously operable motor means, cam means driven by said motor means at substantially constant speed and adapted to produce through a limited range a uniformly increasing deflection and a quick return, two followers adapted to engage said cam means and to be cyclically and similarly actuated, and by their relative displacement in the direction of travel of said cam means to receive their actuation in a time phase relationship corresponding to said displacement, together with an impulse controlling couple subject at all times to the relative positions of said followers, and means operable during movement of said cam means to vary the magnitude of said displacement in conformity with a measured magnitude.

JOHN R. PATTEE.